United States Patent
Ko et al.

(10) Patent No.: US 11,632,730 B2
(45) Date of Patent: Apr. 18, 2023

(54) METHOD AND APPARATUS FOR GENERATING PSBCH SCRAMBLING SEQUENCE IN NR V2X

(71) Applicant: LG ELECTRONICS INC., Seoul (KR)

(72) Inventors: Woosuk Ko, Seoul (KR); Hyunsoo Ko, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/714,588

(22) Filed: Apr. 6, 2022

(65) Prior Publication Data

US 2022/0232497 A1  Jul. 21, 2022

Related U.S. Application Data

(63) Continuation of application No. PCT/KR2020/013578, filed on Oct. 6, 2020.
(Continued)

(51) Int. Cl.
*H04W 56/00* (2009.01)
*H04W 72/12* (2009.01)
(Continued)

(52) U.S. Cl.
CPC ..... *H04W 56/001* (2013.01); *H04W 72/0466* (2013.01); *H04W 72/1263* (2013.01); *H04W 92/18* (2013.01)

(58) Field of Classification Search
None
See application file for complete search history.

(56) References Cited

U.S. PATENT DOCUMENTS

| 2019/0090293 A1 | 3/2019 | Su |
| 2021/0068101 A1* | 3/2021 | Chen ..................... H04L 1/0061 |

(Continued)

OTHER PUBLICATIONS

PCT International Application No. PCT/KR2020/013578, International Search Report dated Jan. 12, 2021, 4 pages.
(Continued)

*Primary Examiner* — Saba Tsegaye
(74) *Attorney, Agent, or Firm* — Lee Hong Degerman Kang Waimey

(57) ABSTRACT

A method for performing, by a first apparatus, wireless communication is proposed in an embodiment. The method may comprise a step for generating a plurality of sidelink-synchronization signal blocks (S-SSBs) and transmitting the plurality of S-SSBs to a second apparatus within a preset period. For example, each of the plurality of S-SSBs may include a sidelink primary synchronization signal (S-PSS), sidelink secondary synchronization signal (S-SSS), and a physical sidelink broadcast channel (PSBCH). For example, the step for transmitting the plurality of S-SSBs within the preset period may comprise a step for performing scrambling on bit information associated with the PSBCH, modulating the scrambled bit information into a complex signal, and mapping the complex signal onto a physical resource. For example, the scrambling may be performed on the PSBCH included in each of the plurality of S-SSBs on the basis of a same scrambling sequence.

20 Claims, 23 Drawing Sheets

Related U.S. Application Data

(60) Provisional application No. 62/911,355, filed on Oct. 6, 2019, provisional application No. 62/911,351, filed on Oct. 6, 2019, provisional application No. 62/932,431, filed on Nov. 7, 2019.

(51) Int. Cl.
  *H04W 72/04* (2009.01)
  *H04W 72/044* (2023.01)
  *H04W 72/1263* (2023.01)
  *H04W 92/18* (2009.01)

(56) References Cited

U.S. PATENT DOCUMENTS

| | | | |
|---|---|---|---|
| 2021/0105760 A1* | 4/2021 | Chen | H04L 27/2601 |
| 2021/0320749 A1* | 10/2021 | Liu | H04L 1/0023 |
| 2021/0410084 A1* | 12/2021 | Li | H04W 52/265 |
| 2022/0070805 A1* | 3/2022 | Ohara | H04W 4/46 |

OTHER PUBLICATIONS

3rd Generation Partnership Project, "Technical Specification Group Radio Access Network; Overall description of Radio Access Network (RAN) aspects for Vehicle-to-everything (V2X) based on LTE and NR (Release 16)," 3GPP TR 37.985 V0.1.0, Aug. 2019, 22 pages.

3rd Generation Partnership Project, "Technical Specification Group Radio Access Network; Evolved Universal Terrestrial Radio Access (E-UTRA); Physical channels and modulation (Release 15)," 3GPP TS 36.211 V15.7.0, Sep. 2019, 63 pages.

ETRI, "Sidelink Design for NR V2X," R1-1809498, 3GPP TSG RAN WG1 Meeting 94, Aug. 2018, 9 pages.

CATT, "Discussion on physical layer structure in NR V2X," R1-1812617, 3GPP TSG RAN WG1 Meeting #95, Nov. 2018, 13 pages.

* cited by examiner

FIG. 4
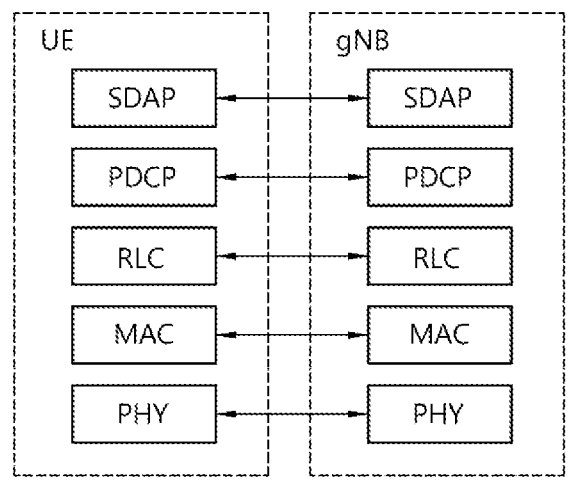
(a)
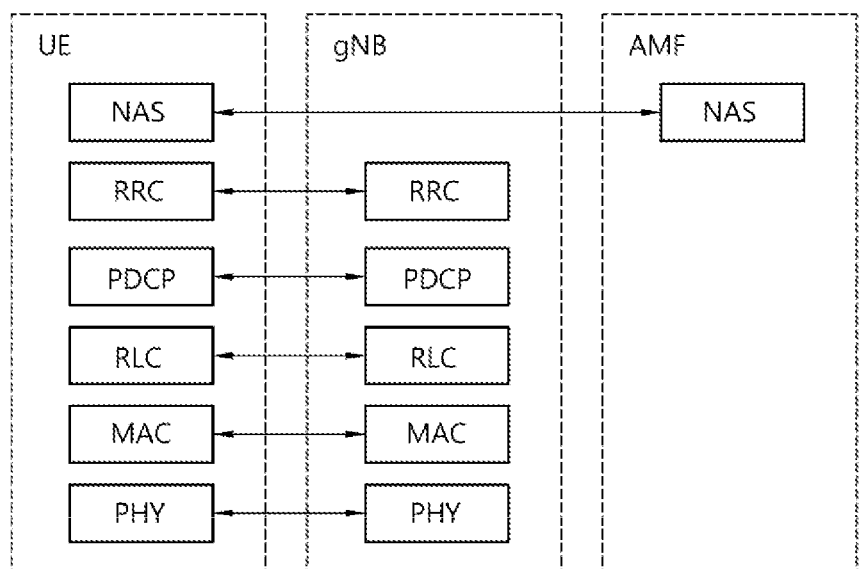
(b)

FIG. 8
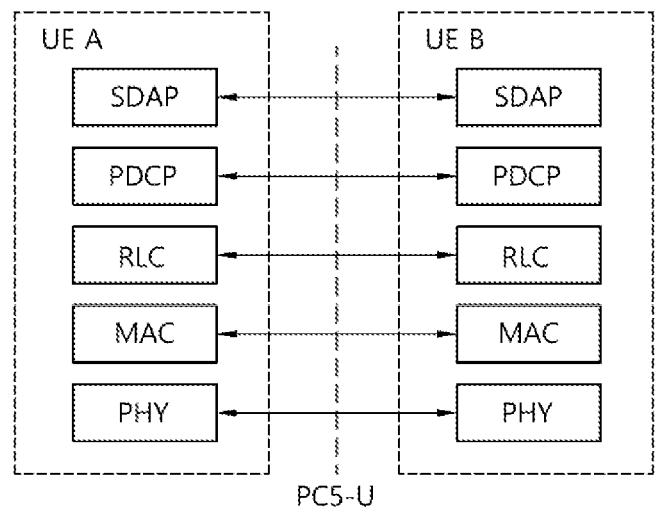
(a)
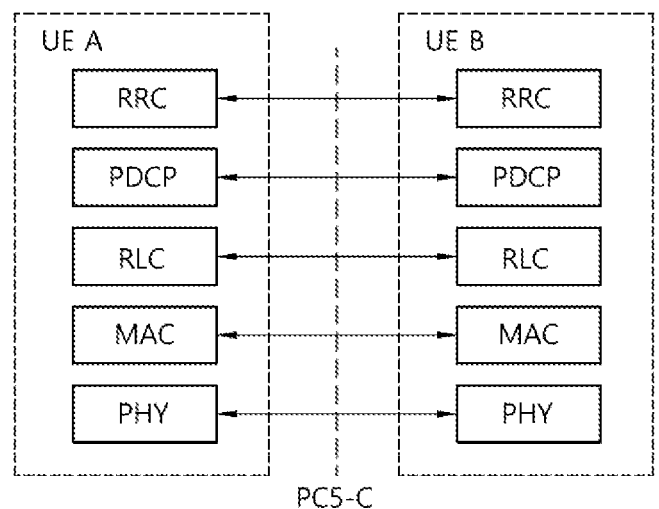
(b)

S1710

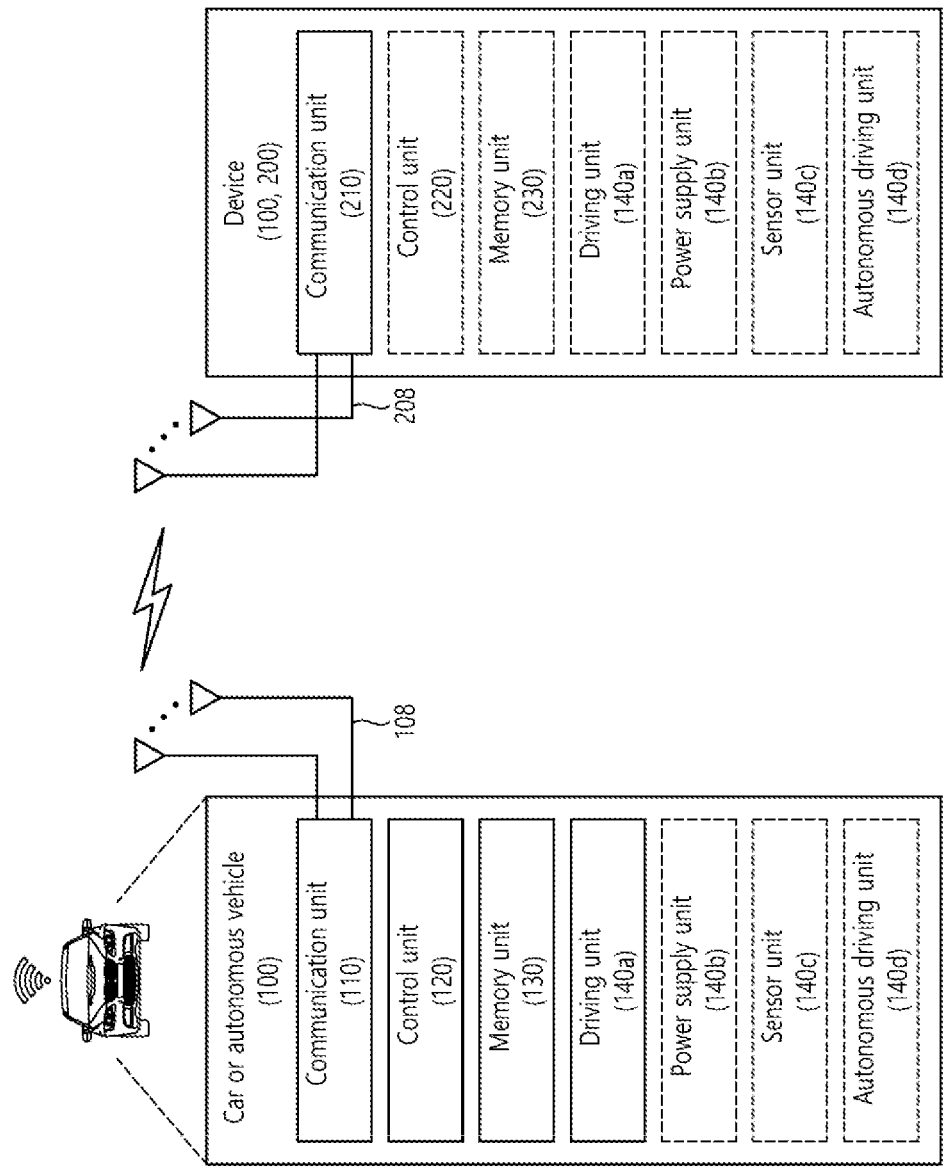

METHOD AND APPARATUS FOR GENERATING PSBCH SCRAMBLING SEQUENCE IN NR V2X

CROSS-REFERENCE TO RELATED APPLICATIONS

This application is a continuation of International Application No. PCT/KR2020/013578, filed on Oct. 6, 2020, which claims the benefit of U.S. Provisional Patent Application No. 62/911,355 filed on Oct. 6, 2019, U.S. Provisional Patent Application No. 62/911,351 filed on Oct. 6, 2019, and U.S. Provisional Patent Application No. 62/932,431 filed on Nov. 7, 2019, the contents of which are all hereby incorporated by reference herein in their entireties.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in sidelink (SL) communication, for example, a user equipment (UE) may transmit a master information block (MIB) for a sidelink (SL) communication system and timing information related to Sidelink-Synchronization Signal Block (S-SSB) transmission through a Physical Sidelink Broadcast Channel (PSBCH) that configures an S-SSB together with a Sidelink Primary Synchronization Signal (S-PSS) and a Sidelink Secondary Synchronization Signal (S-SSS). At this point, in order to prevent degradation in PSBCH reception performance, the UE may perform scrambling on PSBCH data.

Technical Solutions

According to an embodiment, provided herein is a method for performing, by a first device, wireless communication. The method may include the steps of generating a plurality of sidelink-synchronization signal blocks (S-SSBs), and transmitting the plurality of S-SSBs to a second device within a pre-configured period. For example, each of the plurality of S-SSBs may include a sidelink primary synchronization signal (S-PSS), a sidelink secondary synchronization signal (S-SSS), and a physical sidelink broadcast channel (PSBCH). For example, transmitting the plurality of S-SSBs within a pre-configured period may include the steps of performing scrambling on bit information related to the PSBCH, modulating the scrambled bit information to a complex signal, and mapping the complex signal within a physical resource. For example, the scrambling may be performed for a PSBCH being included in each of the plurality of S-SSBs based on a same scrambling sequence.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 23 shows a vehicle or an autonomous vehicle, based on an embodiment of the present disclosure.

DESCRIPTION OF EXEMPLARY EMBODIMENTS

Figure 1:
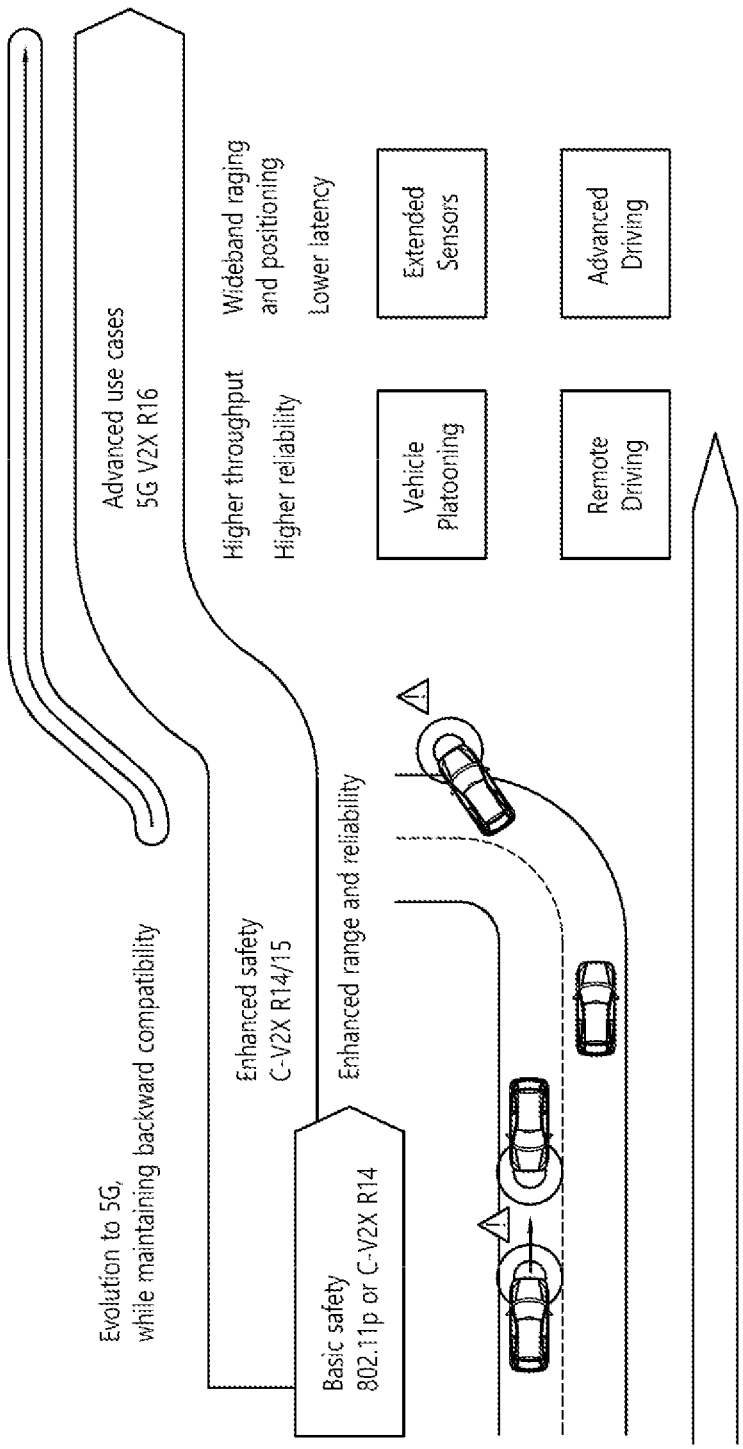
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
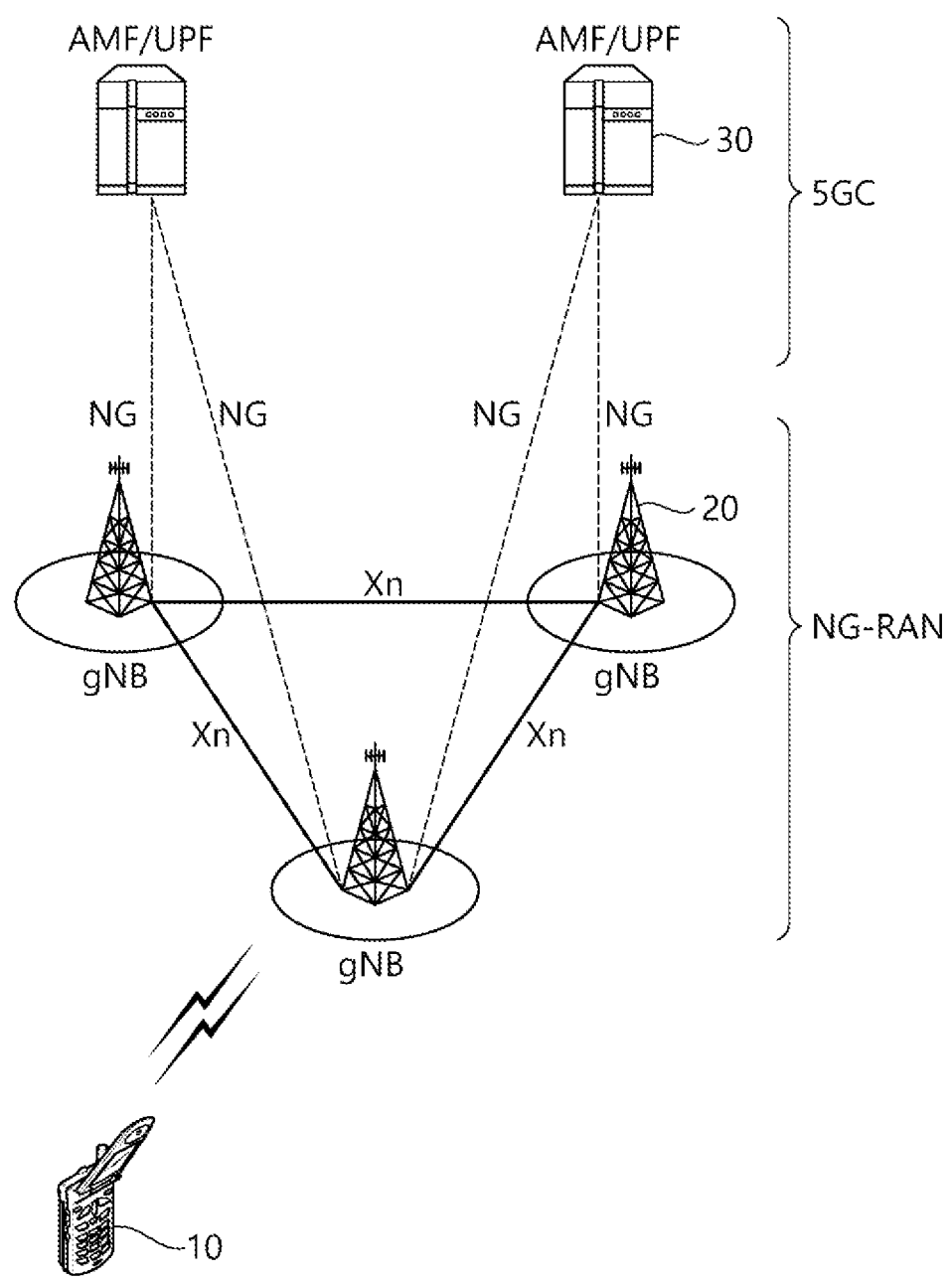
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
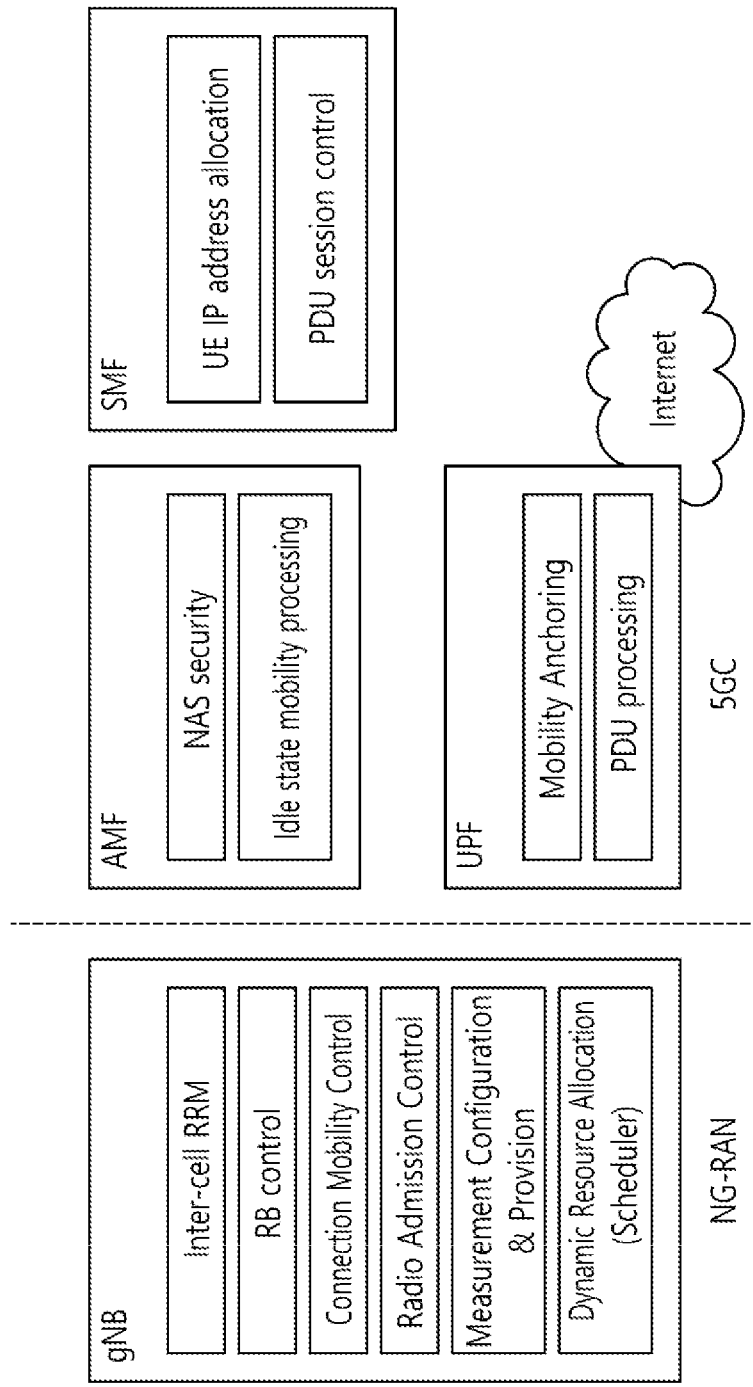
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
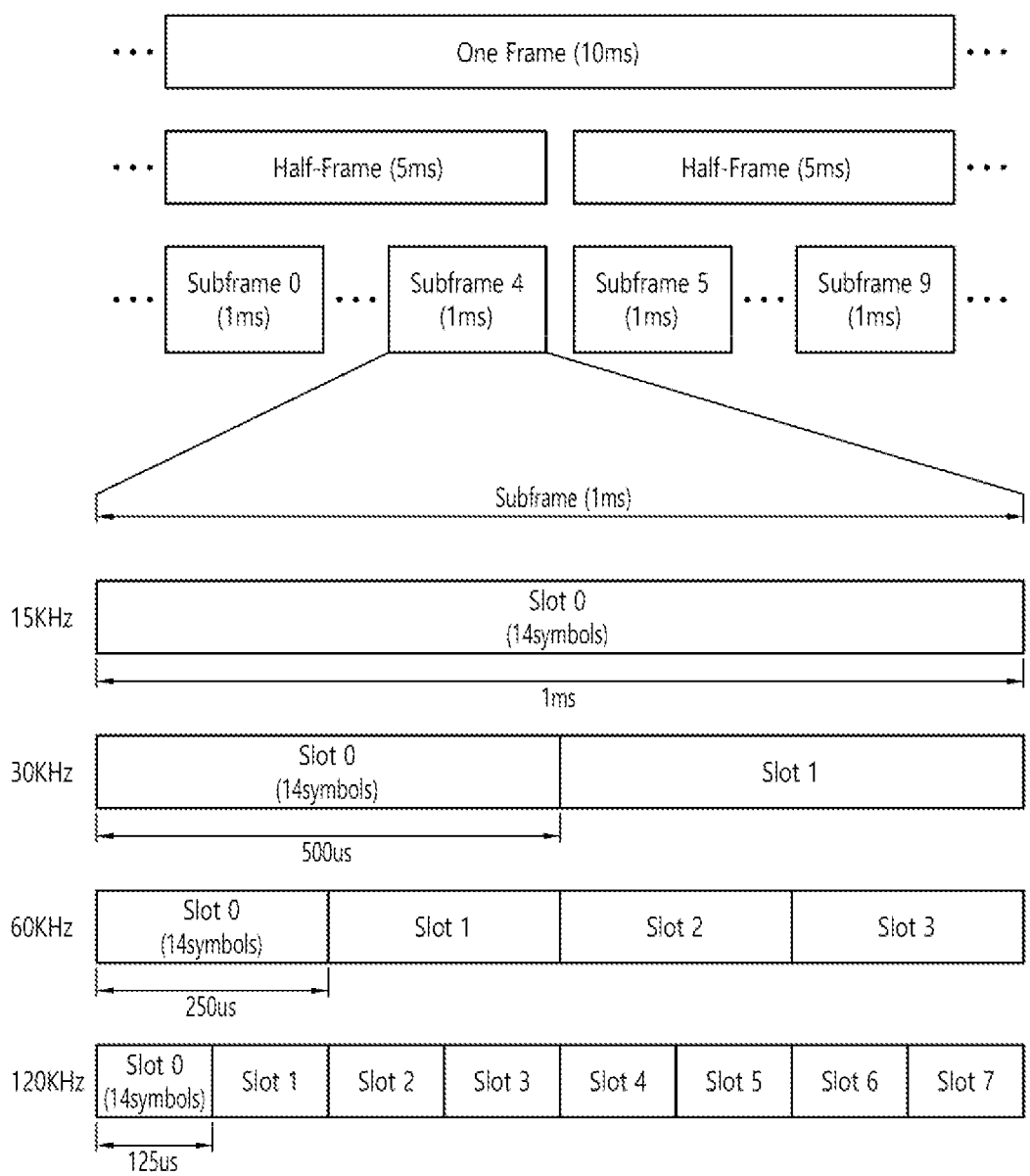
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
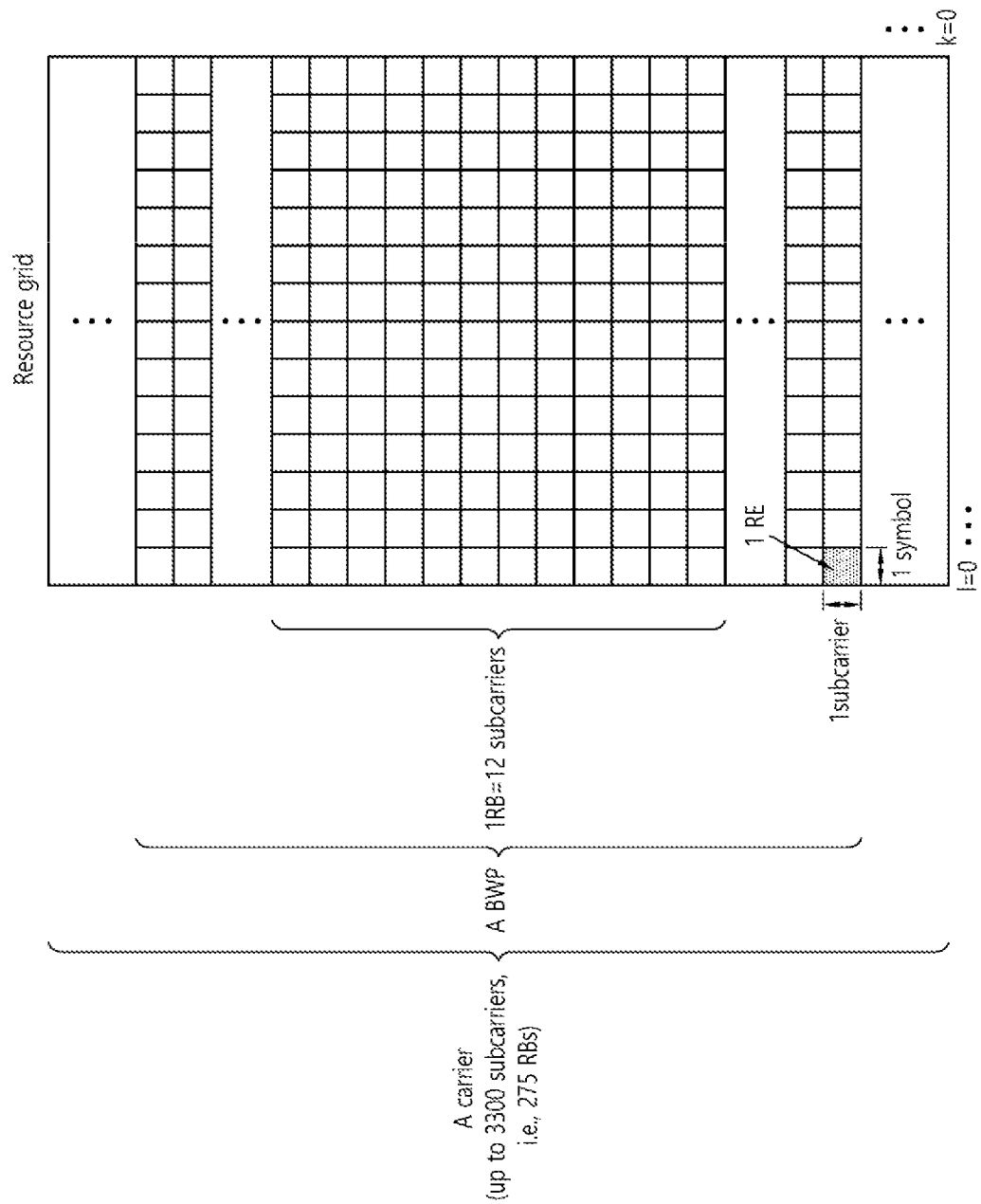
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
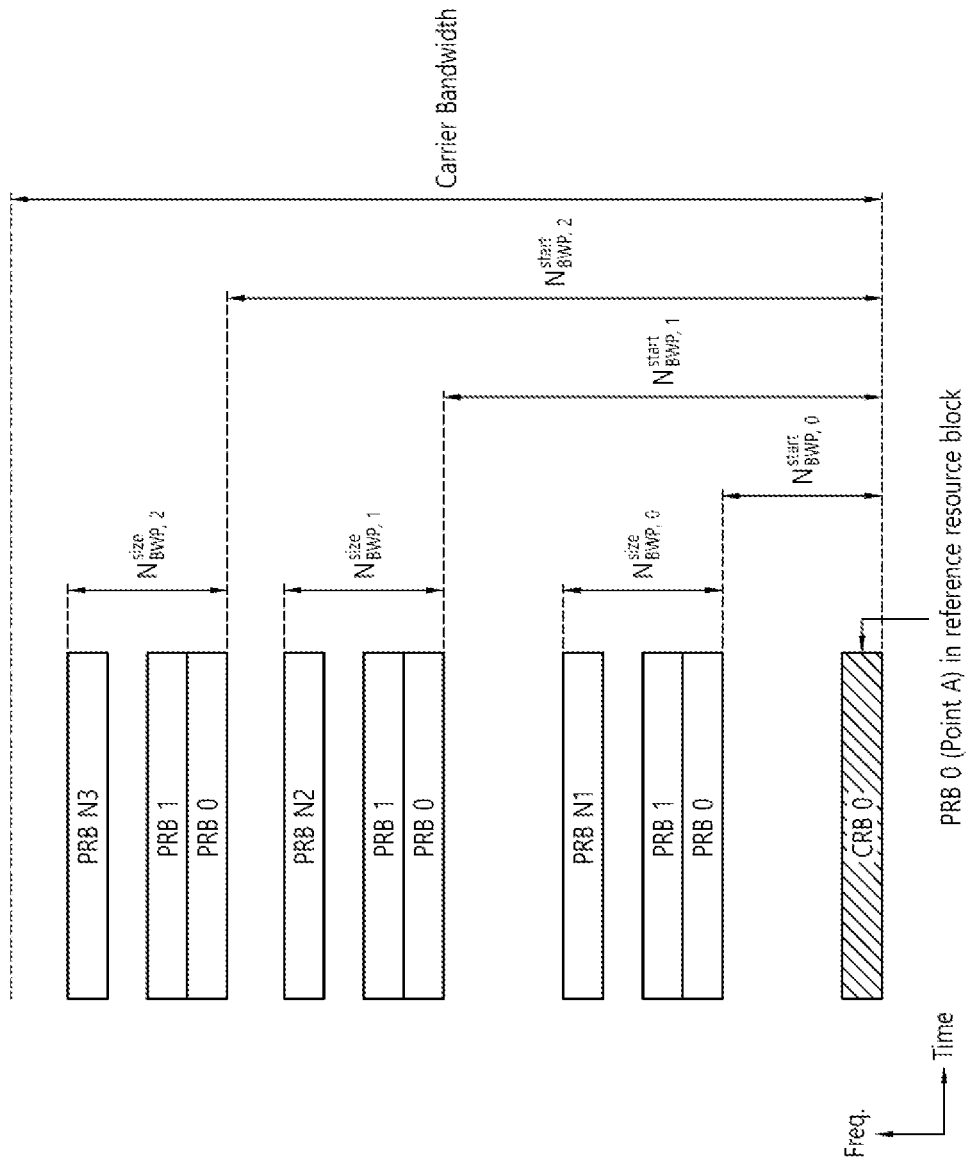
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
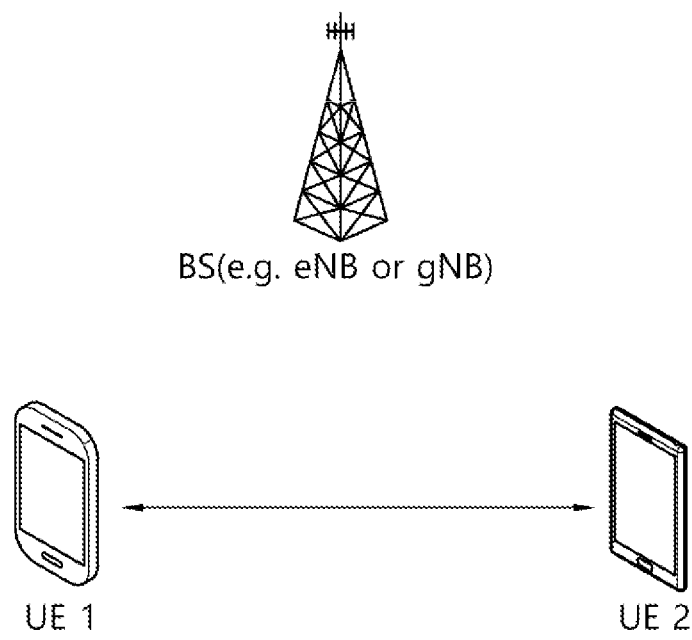
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
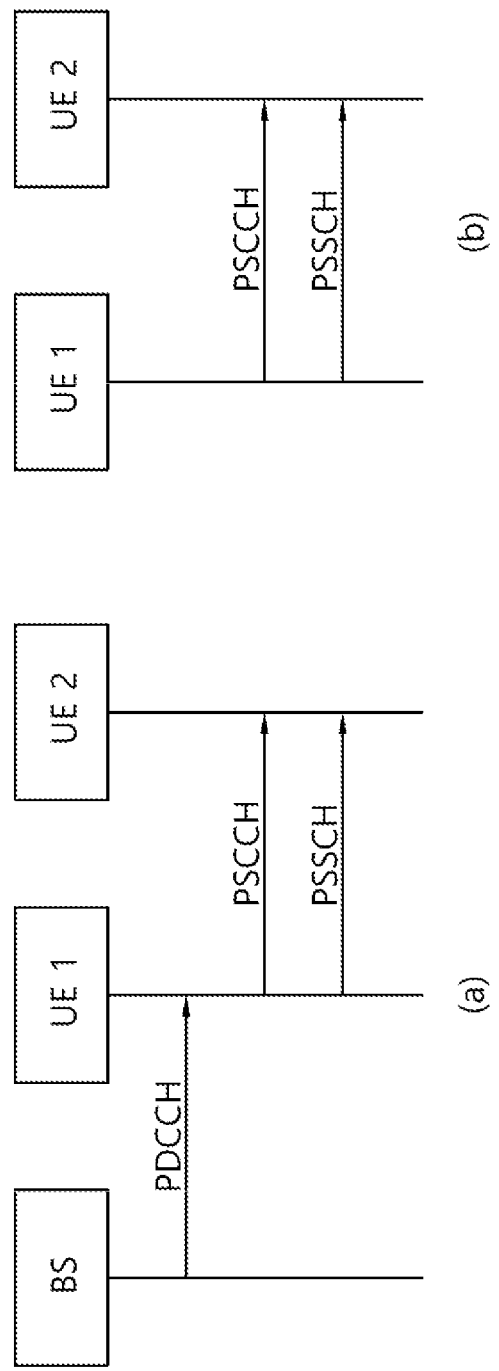
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
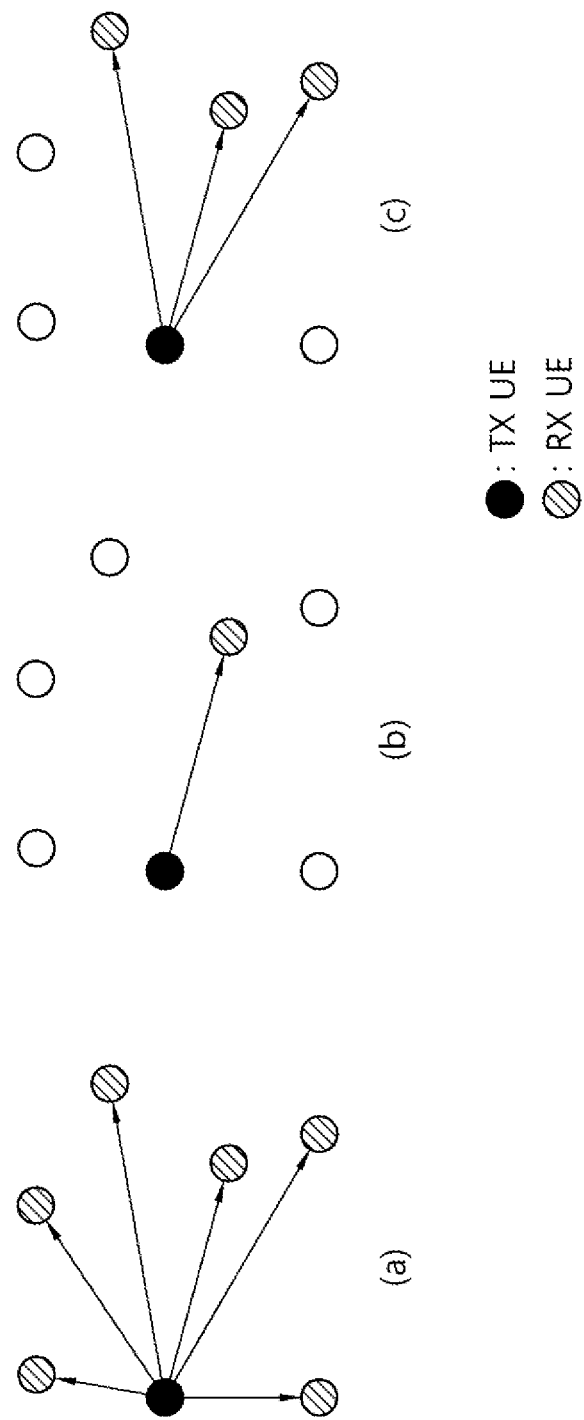
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 12:
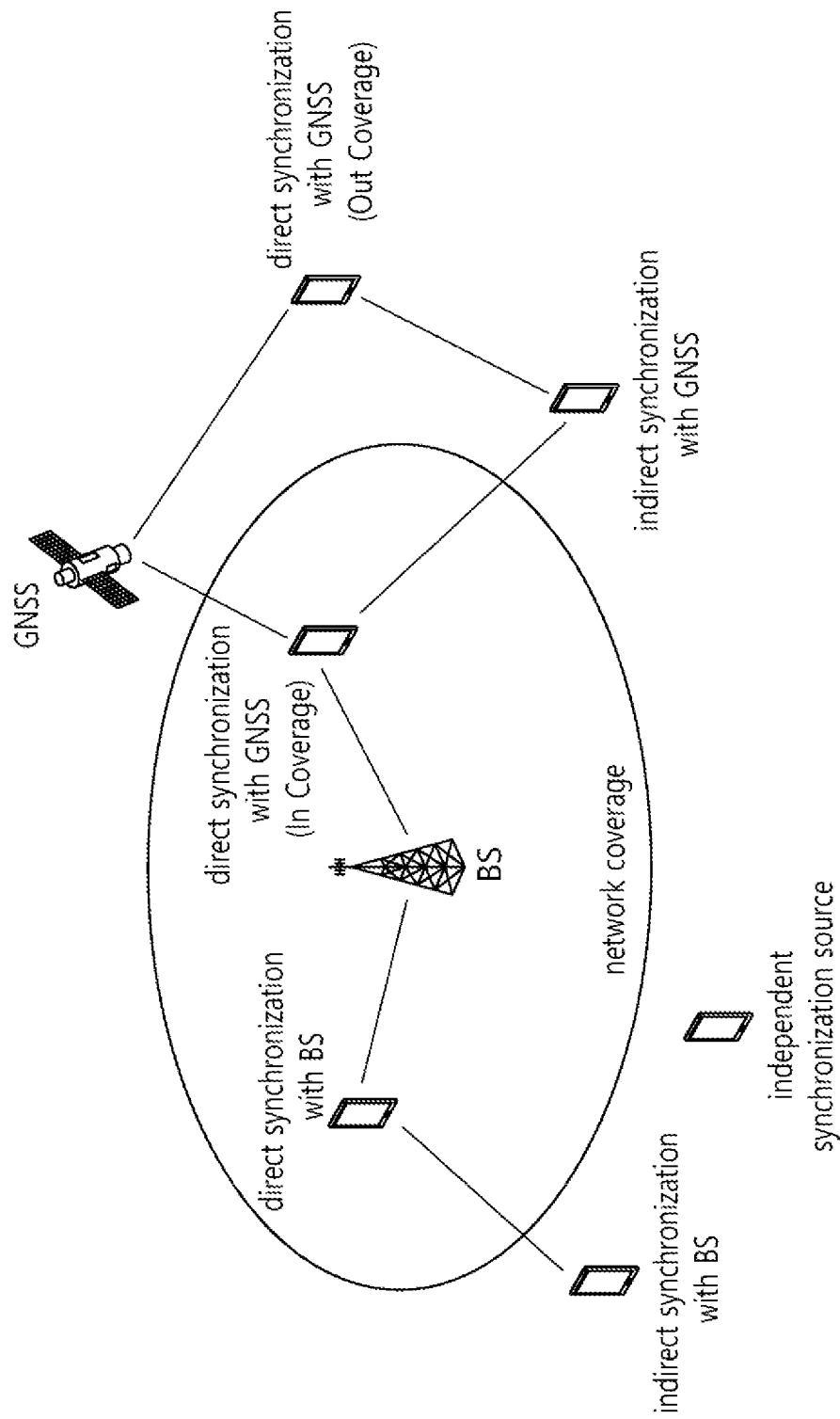
FIG. 12 shows a synchronization source or synchronization reference of V2X, based on an embodiment of the present disclosure.

FIG. 12 shows a synchronization source or synchronization reference of V2X, based on an embodiment of the present disclosure. The embodiment of FIG. 12 may be combined with various embodiments of the present disclosure.

Referring to FIG. 12, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

A SL synchronization source may be associated/related with a synchronization priority. For example, a relation between the synchronization source and the synchronization priority may be defined as shown in Table 5 or Table 6. Table 5 or Table 6 are for exemplary purposes only, and the relation between the synchronization source and the synchronization priority may be defined in various forms.

TABLE 5

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 5 or Table 6, P0 may denote a highest priority, and P6 may denote a lowest priority. In Table 5 or Table 6, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

Meanwhile, in sidelink (SL) communication, for example, a UE may transmit a master information block (MIB) for a sidelink (SL) communication system and timing information related to S-SSB transmission through a PSBCH that configures an S-SSB together with a S-PSS and a S-SSS.

Figure 13:
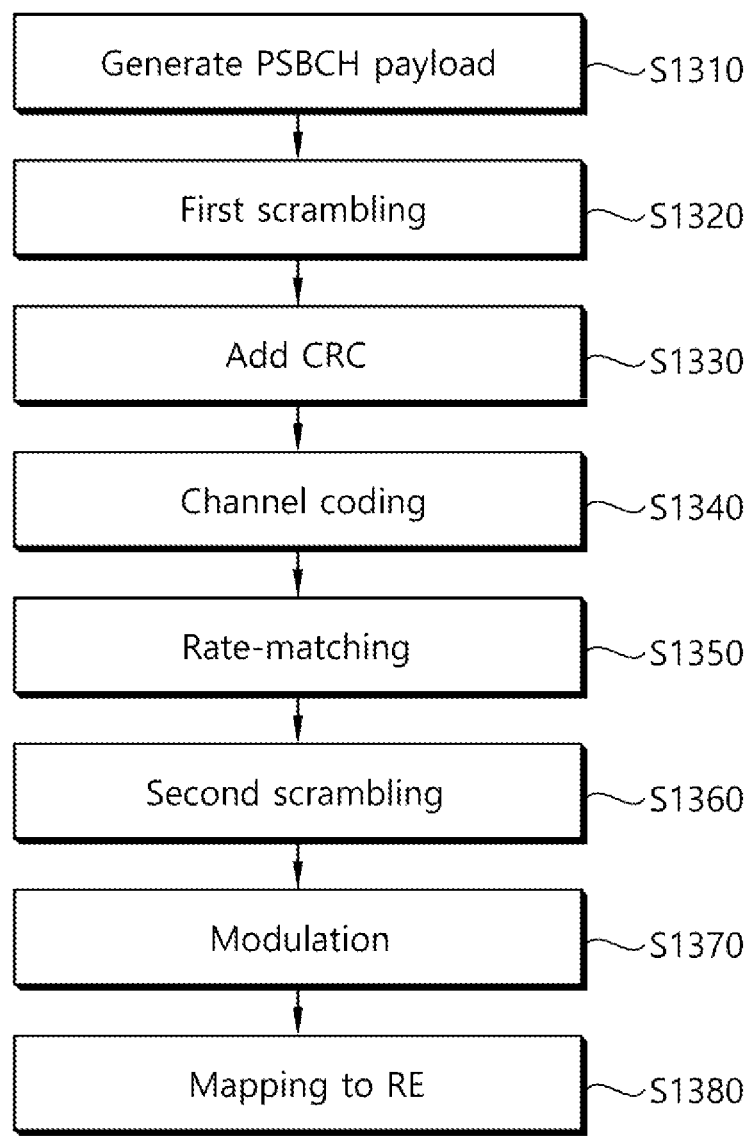
FIG. 13 shows an overall process of transmitting payload data that is transmitted by a physical sidelink broadcast channel (PSBCH) according to an embodiment of the present disclosure.

FIG. 13 shows an overall process of transmitting payload data that is transmitted by a physical sidelink broadcast channel (PSBCH) according to an embodiment of the present disclosure. FIG. 13 may be combined with various embodiments of the present disclosure.

Referring FIG. 13, in step S1310, the UE may determine payload data of a PSBCH that is to be transmitted to the PSBCH. In step S1320, the UE may perform first scrambling on the payload data of the PSBCH. In step S1330, the UE may add CRC to the payload data. In step S1340, the UE may perform channel coding. For example, the UE may perform an FEC process for correcting an error that may occur within a transmitting channel. In step S1350, the UE may perform rate matching. The UE may adjust a size (or amount) of transmitted PSBCH data within a resource that is related to a given transmitting channel that is available for usage. In step S1360, the UE may perform second scrambling on the payload data of the PSBCH. In step S1370, the UE may modulate bit information that is related to the PSBCH data to a complex signal. In step S1380, the UE may map the rate-matched PSBCH signal to a resource element (RE), which is a transmission resource.

In the present disclosure, when the UE transmits PSBCH data, the UE may randomize interference caused by an adjacent channel or adjacent carrier. That is, for example, the UE may perform efficient scrambling on PSBCH data for preventing degradation in PSBCH reception performance. Hereinafter, scrambling on PSBCH data of the UE will be described.

For example, in the above-described step S1310, payload data of a PSBCH may include information that is signaled by a higher layer and information that is signaled by a physical layer. For example, the information that is signaled by a higher layer may include an MIB, which is information being transferred (or delivered) to a physical layer for a sidelink transmission. For example, an MIB may include at least one of a slot structure or a frame number (e.g., 6 MSBs). For example, information that is determined by a physical layer may include at least one of a frame number (e.g., 4 LSBs), a slot index or S-SSB index (3 MSBs).

In the above-described embodiment, for example, a slot structure may represent a TDD slot configuration that determines uplink support, downlink support, flexible resource, and sidelink resource by a base station. For example, a frame number may indicate a frame index within a 10240 ms period. For example, a slot index may represent an order of slots within one frame. For example, a UE may transmit a maximum of 64 S-SSBs to within one S-SSB transmission period. For example, an S-SSB index may indicate an order of the maximum of 64 S-SSBs. For example, when SCS is 15/30/60/120 kHz, since a 120 kHz SCS within a frame of 10 ms may transmit a maximum of 80 slots, a slot index may be expressed as 7 bits.

According to an embodiment, a UE may periodically transmit an S-SSB. For example, a number of S-SSBs within one period may be determined in proportion to SCS. For example, in case of frequency FR1 (<6 GHz), the number of S-SSBs within one period may be equal to 1 or 2 at 15 kHz, 1, 2 or 4 at 30 kHz, and 1, 2, 4 or 8 at 60 kHz. For example, in case of frequency FR2 (>6 GHz), the number of S-SSBs within one period may be equal to 1, 2, 4, 8, 16 or 32 at 60 kHz, and 1, 2, 4, 8, 16, 32 or 64 at 120 kHz. For example, since the UE may transmit a maximum of 64 slots within one S-SSB period, a slot index may be expressed as 6 bits. For example, among 6 bits related to an S-SSB index, 3 bits of MSB may be transmitted through a PSBCH payload, and 3 bits of LSB may be transmitted through an PSBCH DM-RS. For example, the UE may transmit 3 bits of MSB being related to the S-SSB index through a PSBCH payload and may transmit 3 bits of LSB being related to the S-SSB index through a PSBCH DM-RS.

According to an embodiment, first scrambling for a PSBCH transmission may be applied before performing channel coding. For example, a scrambling sequence that is used for the first scrambling may be initialized at each S-SSB period. At this point, a pseudo-random sequence c(j) may be used as the scrambling sequence, and the UE may perform initialization by using an SL-SSID. For example, the scrambling sequences that are applied at each S-SSB may all be different within one S-SSB period. Alternatively, for example, the scrambling sequences that are applied at each S-SSB may all be the same within one S-SSB period.

Figure 14:
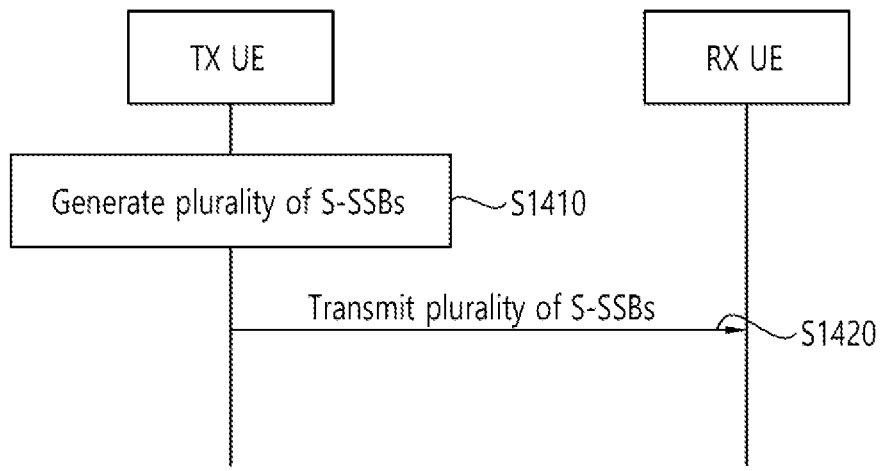
FIG. 14 shows a procedure of transmitting a plurality of sidelink-synchronization signal blocks (S-SSBs), by a transmitting UE, to a receiving UE according to an embodiment of the present disclosure.

FIG. 14 shows a procedure of transmitting a plurality of sidelink-synchronization signal blocks (S-SSBs), by a transmitting UE, to a receiving UE according to an embodiment of the present disclosure. FIG. 14 may be combined with various embodiments of the present disclosure.

Referring to FIG. 14, in step S1410, the transmitting UE may generate a plurality of S-SSBs. For example, each of the plurality of S-SSBs may include an S-PSS, an S-SSS, and a PSBCH.

In step S1420, the transmitting UE may transmit a plurality of S-SSBs to a receiving UE within a pre-configured period. For example, the transmitting UE may perform scrambling on bit information related to a PSBCH. For example, the transmitting UE may demodulate the scrambled bit information to a complex signal. For example, the transmitting UE may map the complex signal on a physical layer. For example, the transmitting UE may perform scrambling on a PSBCH that is included in each of the plurality of S-SSBs based on a same scrambling sequence. For example, a scrambling sequence may be initialized at each pre-configured period based on an SL-SSID. For example, the transmitting UE may generate a scrambling sequence based on one of a frame number or a slot number through which a first S-SSB, among the plurality of S-SSBs, is transmitted within a pre-configured period. For example, the transmitting UE may generate a scrambling sequence based on a time interval in-between the plurality of S-SSBs within the pre-configured period. For example, a scrambling sequence may be initialized at a start (or beginning) of each pre-configured period based on an SL-SSID. For example, a scrambling sequence may be initialized at a starting point of a time domain and/or a frequency domain of each of the plurality of S-SSBs based on an SL-SSID.

Alternatively, for example, the transmitting UE may generate scrambling sequences differently based on a shift value. For example, a shift value may be determined or configured based on an S-SSB index, a slot index or a frame number. For example, each of the plurality of S-SSBs may include an S-SSB index and a synchronization resource indicator. For example, a shift value may be determined or configured based on a field related to a synchronization resource indicator. For example, a receiving UE may identify a synchronization resource related to an S-SSB based on a synchronization resource indicator.

According to an embodiment of the present disclosure, the transmitting UE may use a same scrambling sequence. At this point, for example, the transmitting UE may generate a scrambling sequence based on an SL-SSID. For example, the transmitting UE may generate a scrambling sequence based on an offset according to which a first S-SSB is transmitted during an S-SSB period that is determined by higher layer signaling. That is, for example, the transmitting UE may generate a scrambling sequence based on a frame number through which a first S-SSB is transmitted. Alternatively, for example, the transmitting UE may generate a scrambling sequence based on a slot index within a frame through which a first S-SSB is transmitted. Alternatively, for example, the transmitting UE may generate a scrambling sequence based on a time interval in-between S-SSBs within one S-SSB period. That is, the transmitting UE may generate a scrambling sequence based on a number of frames or a number of slots within one S-SSB period. For example, the transmitting UE may generate a scrambling sequence based on a value that is pre-configured by higher layer signaling.

According to an embodiment of the present disclosure, the transmitting UE may use a different scrambling sequence at each S-SSB within one S-SSB period. In this case, for example, $S_{iS\text{-}SSB}^{1}$, which is a scrambling sequence for performing first scrambling, may be generated by using Equation 1 shown below.

$$S_{iS\text{-}SSB}^{1} = c(j + v \cdot M_1), j = 0, \ldots, M_1 - 1 \qquad \text{[Equation 1]}$$

At this point, for example, $M_1$ may be a length of payload data of a PSBCH to which scrambling is to be applied (or a PSBCH that is to be scrambled). v may be a shift value for applying a different scrambling sequence for each S-SSB. That is, for example, a scrambling sequence having a length of $M_1$ may be needed for each S-SSB, and the transmitting UE may generate a pseudo-random sequence c(i) having a sufficiently long length. And, by selecting a sequence having a length of $M_1$ from c(i) as the scrambling sequence for a first S-SSB, the transmitting UE may perform scrambling. By selecting a next sequence having a length of $M_1$ from c(i) as the scrambling sequence for a second S-SSB, the transmitting UE may perform scrambling. As described above, v may be a variable indicating an order of a scrambling sequence that is to be applied to a specific S-SSB. For example, the transmitting UE may select a c(i) sequence equivalent to an $M_1$ length from a shifted position that is proportional to v. Thereafter, the transmitting UE may perform scrambling on the selected c(i) sequence.

According to the various embodiments of the present disclosure, in the above-described Equation 1, the shift value v may be determined as described below. At this point, for example, when information determining the shift value v is included in a PSBCH payload, a first scrambling process may not be applied for the corresponding information.

According to an embodiment, a shift value v may be determined based on all or part of 3 MSBs of an S-SSB index being transmitted through a PSBCH payload. For example, the transmitting UE may use a v value that is different from that of the second scrambling process. For example, in case of FR1, the shift value v may be equal to 0, and the transmitting UE may apply the same scrambling sequence for all S-SSBs.

According to an embodiment, a shift value v may be determined based on all or part of 3 LSBs of an S-SSB index being transmitted through a PSBCH DM-RS. For example, a transmitting UE may use a v value that is the same as that of the second scrambling process. For example, by using a value that is obtained by DM-RS detection that is more robust than a value related to the PSBCH payload, the transmitting UE may perform scrambling. For example, since the lengths of the data being scrambled are different, a first scrambling sequence and a second scrambling sequence may be different for each S-SSB.

According to an embodiment, a shift value v may be determined based on all or part of S-SSB indexes being transmitted through at least one of a PSBCH payload or a PSBCH DM-RS. For example, by always using a different scrambling sequence for each S-SSB regardless of FR1 and FR2, the transmitting UE may maximize an interference randomization effect.

According to an embodiment, a shift value v may be determined based on all or part of slot indexes being transmitted through a PSBCH payload. For example, by using a slot index value that is irrelevant to the second scrambling process, the transmitting UE may gain a diversity effect in comparison with the second scrambling process in the aspect of interference randomization. However, for example, different scrambling sequences or a same scrambling sequence may be used for each S-SSB in accordance with an offset and time interval for an S-SSB transmission position. For example, in order to always apply different scrambling sequences, a slot index may be different configured for each S-SSB.

According to an embodiment, a shift value v may be determined based on all or part of 4 LSBs of a frame number being transmitted through a PSBCH payload. For example, by using all or part of 4 LSBs of a frame number, the transmitting UE may determine a shift value that is needed for generating a scrambling sequence. For example, by using a frame number value that is irrelevant to the second scrambling process, the transmitting UE may gain a diversity effect in comparison with the second scrambling process in the aspect of interference randomization. Additionally, for example, the transmitting UE may use different scrambling sequences for each S-SSB within one S-SSB period regardless of the offset and time interval for an S-SSB transmission position.

According to an embodiment, the shift value v may be determined based on a field value that is included in MIB information.

TABLE 7

| PSBCH contents | MIB # bits | Payload # bits | Notes |
|---|---|---|---|
| DFN | 6 | 4 | Direct frame number |
| TDD configuration | 11 | | System-wide configuration for potential SL slots |
| In-coverage indicator | | 1 | Same as LTE-V2X |
| Slot index within a frame | | 7 | For exacting timing information of S-SSB |
| Reserved | | 2 | For future extension |
| CRC | | 24 | |
| Total bits (55) | 17 | 38 | |

Referring to Table 7, a PSBCH payload may be configured as shown in Table 7. For example, in Table 7, in the viewpoint of a sidelink communication system or a cell-specific viewpoint, a TDD configuration may indicate information related to a candidate sidelink resource that may be used for sidelink communication that is commonly applied to all UEs. At this point, for example, in the above-described Equation 1, the shift value v may be determined based on all or part of 6 bits of DFN MSB. Alternatively, for example, the shift value v may be determined based on all or part of a TDD configuration field.

For example, in case of Table 7, since the top 3 MSBs of the S-SSB index are not transmitted, as described above, in order to determine the v value based on an S-SSB index, the transmitting UE may estimate the S-SSB index by using pattern information related to a synchronization resource (or sync resource) that is pre-configured for higher layer signaling and a slot index. The transmitting UE may determine a shift value v based on the estimated S-SSB index.

According to an embodiment, the shift value v may be determined based on a synchronization resource indicator field.

TABLE 8

| PSBCH contents | MIB # bits | Payload # bits | Notes |
|---|---|---|---|
| DFN | 6 | 4 | Direct frame number |
| TDD configuration | 11 | | System-wide configuration for potential SL slots |
| In-coverage indicator | | 1 | Same as LTE-V2X |
| S-SSB index | | 3 | 3 MSB of S-SSB index |
| Sync resource indicator | | 2 | Which sync resource is used for S-SSB transmission |
| Reserved | | 2 | For future extension |
| CRC | | 24 | |
| Total bits (53) | 17 | 36 | |

Referring to Table 8, a PSBCH payload may be configured as shown in Table 8. For example, in Table 8, a synchronization (or sync) resource indicator may indicate a sync resource through which the corresponding S-SSB is transmitted, among 2 or more sync resources that are configured by higher layer signaling. For example, by using information related to a sync resource indicator, the transmitting UE may determine accurate timing for an S-SSB without ambiguity. In the above-described Equation 1, the transmitting UE may determine a shift value v by using a field that is related to the sync resource indicator in Table 8. At this point, for example, scrambling sequences for a PSBCH may be different in accordance with a sync resource through which the S-SSB is transmitted.

According to an embodiment, when the transmitting UE perform scrambling based on the above-described shift value v, for a plurality of S-SSBs being transmitted within one S-SSB period, the transmitting UE may generate an S-SSB group that is configured of a number of S-SSBs. In this case, instead of applying different scrambling sequences for all of the S-SSBs, the transmitting UE may apply a different scrambling sequence per S-SSB group, and a same scrambling sequence may be applied to each S-SSB group. For example, when the transmitting UE determines a shift value v based on a frame number, the transmitting UE divides one S-SSB period of 160 ms into 4 sub-periods of 40 ms. And, then, the transmitting UE may define or determine the S-SSBs being transmitted at each period as one S-SSB group. In this case, the transmitting UE may use {4th LSB, 3rd LSB} as the shift value v, wherein the lower 2 LSBs from 4 LSBs of the corresponding frame number are excluded. For example, a length of an S-SSB group and a number of different types of scrambling sequences in accordance with the S-SSB group length may be configured or pre-configured by higher layer signaling.

According to an embodiment of the present disclosure, $S_{i_{S\text{-}SSB}}^2$, which is a scrambling sequence for performing second scrambling, may be generated by using Equation 2 shown below.

$$S_{i_{S\text{-}SSB}}^2 = c(j+v \cdot M_2), j=0, \ldots, M_2-1 \quad \text{[Equation 2]}$$

At this point, for example, $M_2$ may be a length of payload data of a PSBCH to which scrambling is to be applied (or a PSBCH that is to be scrambled). v may be a shift value for applying a different scrambling sequence for each S-SSB. That is, for example, a scrambling sequence having a length of $M_2$ may be needed for each S-SSB, and the transmitting UE may generate a pseudo-random sequence c(i) having a sufficiently long length. And, by selecting a sequence having a length of $M_2$ from c(i) as the scrambling sequence for a first S-SSB, the transmitting UE may perform scrambling. By selecting a next sequence having a length of $M_2$ from c(i) as the scrambling sequence for a second S-SSB, the transmitting UE may perform scrambling. As described above, v may be a variable indicating an order of a scrambling sequence that is to be applied to a specific S-SSB. For example, the transmitting UE may select a c(i) sequence equivalent to an $M_2$ length from a shifted position that is proportional to v. Thereafter, the transmitting UE may perform scrambling on the selected c(i) sequence.

For example, a shift value v for a second scrambling sequence may be determined based on 3 LSB information of an SSB index that is transmitted to a PSBCH DM-RS. That is, for example, the transmitting UE uses a modulo-8 of the SSB index as the shift value v for a second scrambling sequence. That is, for example, after a receiving UE has performed PSBCH DM-RS detection, by using LSB information of an S-SSB index that may be obtained by performing PSBCH DM-RS detection, the receiving UE may extract information on the second scrambling sequence. For example, the receiving UE may perform a descrambling process based on the extracted information on the scrambling sequence.

For example, the above-described scrambling process that is applied to the PSBCH may be applied only to one scrambling process of two scrambling processes. At this point, for example, the transmitting UE may apply the above-described second scrambling sequence to the one of the two scrambling processes.

In the present disclosure, a UE may apply different scrambling sequences for each S-SSB within one S-SSB period. Alternatively, by generating two types of PSBCH scrambling sequences based on information being transmitted through a PSBCH DM-RS that can be most robustly detected, the transmitting UE may reinforce the performance in the descrambling process of the receiving UE and may maximize the interference randomization effect for PSBCH data.

Meanwhile, an SSB that is used in an initial access of a V2X communication system may be broadly configured of an S-PSS, an S-SSS, and a PSBCH. For example, a PSS signal may be used for obtaining initial signal detection and synchronization. For example, an SSS signal may be used for detecting detailed synchronization and a synchronization signal ID together with a PSS signal. For example, a PSBCH may be used for signaling essential system information (MIB). Therefore, each of the configuration signals may be a highly important signal for obtaining synchronization and essential system information. And, the UE may be required to initially receive an SSB signal for a normal data communication and to perform a decoding process.

The UE may detect synchronization signals that are transmitted by neighboring gNB/eNB/GNSS or other UEs. Thereafter, the UE may select a synchronization signal that is to be used as its reference sync in accordance with a procedure that is configured based on a priority-related rule or RSRP measurement. At this point, for example, the UE may select a reference sync signal among a plurality of sync signal candidates. That is, among the received synchronization signals, the UE may select a sync signal that has successfully performed S-PSS detection and decoding, successfully performed S-SSS detection and decoding, successfully performed PSBCH DM-RS detection and decoding, and, finally, successfully performed PSBCH decoding as its sync signal candidate. That is, the UE may determine a candidate sync signal that is considered as a reference sync through the above-described procedure.

Hereinafter, according to various embodiments of the present disclosure, a method of optimizing a PSBCH decoding process by minimizing power consumption that is needed for PSBCH decoding, by skipping (or omitting) unnecessary PSBCH decoding process(es) based on detection and decoding information on an S-PSS or S-SSS and detection and decoding information on a PSBCH DM-RS in sidelink communication, will be described in detail.

Figure 15:
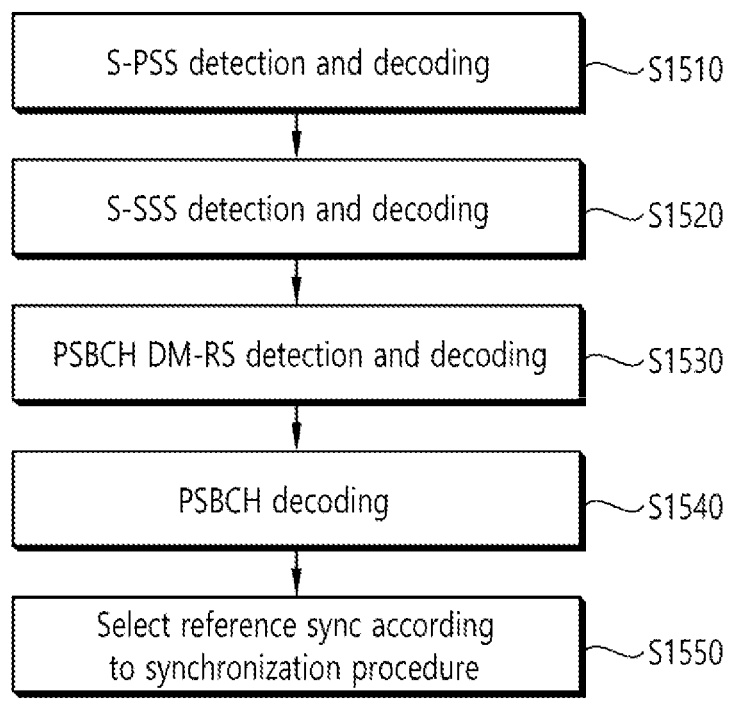
FIG. 15 shows a procedure of selecting a synchronization signal that is received, by a user equipment (UE), from a synchronization source as a reference synchronization signal.

FIG. 15 shows a procedure of selecting a synchronization signal that is received, by a user equipment (UE), from a synchronization source as a reference synchronization signal. FIG. 15 may be combined with various embodiments of the present disclosure.

For example, FIG. 15 may be a synchronization procedure of a specific UE on a synchronization signal that is transmitted by gNB/eNB/GNSS or other UEs neighboring the specific UE. Referring to FIG. 15, in step S1510, a receiving UE may detect and decode an S-PSS that is received from a transmitting UE. For example, the transmitting UE may transmit, to the receiving UE, an S-PSS including S-PSS ID information configuring an SL-SSID and information on synchronization priority of the transmitting UE. In step S1520, the receiving UE may detect and decode an S-SSS that is received from the transmitting UE. In step S1530, the receiving UE may detect and decode a PSBCH DM-RS that is received from the transmitting UE. In step S1540, the receiving UE may detect and decode a PSBCH that is received from the transmitting UE. In step S1550, the receiving UE may select a reference sync based on a synchronization procedure.

According to an embodiment, the transmitting UE may transmit, to the receiving UE, an S-PSS including S-PSS ID information configuring an SL-SSID and information on synchronization priority of the transmitting UE, and the receiving UE may perform up to a PSBCH decoding process in order to change the current reference sync, for S-SSBs having synchronization priority indicated by the received S-PSS that is higher than a synchronization source that is considered as the current reference sync of the receiving UE. Alternatively, for example, in order to reduce power consumption that is needed for unnecessary PSBCH decoding, the receiving UE may not further carry out the process steps subsequent to the above-described step S1510, for S-SSBs having synchronization priority indicated by the received S-PSS that is lower than a synchronization source that is considered as the current reference sync of the receiving UE.

According to an embodiment, after the receiving UE has obtained an S-PSS ID through the above-described step S1510, and after the receiving UE has decoded an S-SSS ID through step S1520, the receiving UE may finally reconstruct (or recover) an SL-SSID from the S-PSS ID and S-SSS ID. At this point, for example, when the SL-SSID indicates synchronization priority, the receiving UE may perform up to a PSBCH decoding process in order to change the current reference sync, for S-SSBs having synchronization priority indicated by the received SL-SSID that is higher than a sync source that is considered as the current reference sync of the receiving UE. Alternatively, in order to reduce power consumption that is needed for unnecessary PSBCH decoding, the receiving UE may not further carry out the process steps subsequent to the above-described step S1520, for S-SSBs having synchronization priority indicated by the received SL-SSID that is lower than a sync source that is considered as the current reference sync of the receiving UE.

According to an embodiment, after the receiving UE has successfully decoded the SL-SSID through step S1510 and step S1520, the receiving UE may detect a PSBCH DM-RS and successfully decode the PSBCH DM-RS through the step S1530. Thereafter, the receiving UE may measure an RSRP for the received PSBCH DM-RS. For example, when the measured RSRP of the PSBCH DM-RS is larger than a pre-configured threshold value, and/or when a synchronization priority indicated by the received SL-SSID is higher than a synchronization source that is considered as the current reference sync of the receiving UE, the receiving UE may perform up to a PSBCH decoding process in order to change the current reference sync for the corresponding S-SSBs. Alternatively, for example, when the measured RSRP of the PSBCH DM-RS is smaller than a pre-configured threshold value, and/or when a synchronization priority indicated by the received SL-SSID is lower than a synchronization source that is considered as the current reference sync of the receiving UE, in order to reduce power consumption that is needed for unnecessary PSBCH decoding for the corresponding S-SSBs, the receiving UE may not further carry out the process steps subsequent to the above-described step S1530.

According to an embodiment, after the receiving UE has successfully decoded the SL-SSID through step S1510 and step S1520, the receiving UE may detect a PSBCH DM-RS and successfully decode the PSBCH DM-RS through the step S1530. Thereafter, the receiving UE may measure an RSRP for the received PSBCH DM-RS. For example, the receiving UE may select a plurality of first S-SSBs having a measured RSRP of the PSBCH DM-RS that is larger than a pre-configured first threshold value, and the receiving UE may select a plurality of second S-SSBs having synchronization priority indicated by the received SL-SSID that is higher than a synchronization source that is considered as the current reference sync, among the plurality of S-SSBs. Thereafter, the receiving UE may perform a PSBCH decoding process only for S-SSBs having a received PSBCH DM-RS RSRP that is higher than a pre-configured second threshold value for a PSBCH DM-RS RSRP corresponding to an S-SSB having the highest synchronization priority, among the plurality of second S-SSBs. For example, when an RSRP of a PSBCH DM-RS that is measured by the receiving UE is smaller than a pre-configured first threshold value, and/or when a synchronization priority indicated by the received SL-SSID is lower than a synchronization source that is considered as the current reference sync by the receiving UE, and/or when the measured PSBCH DM-RS is lower than a second threshold value that is pre-configured for a PSBCH DM-RS RSRP corresponding to an S-SSB having the highest synchronization priority, in order to reduce power consumption that is needed for unnecessary PSBCH decoding, the receiving UE may not further carry out the process steps subsequent to the above-described step S1530.

According to an embodiment, after the receiving UE has successfully decoded the SL-SSID through step S1510 and step S1520, the receiving UE may detect a PSBCH DM-RS and successfully decode the PSBCH DM-RS through the step S1530. Thereafter, the receiving UE may measure an RSRP for the received PSBCH DM-RS. For example, the receiving UE may select a plurality of first S-SSBs having a RSRP of the PSBCH DM-RS, which is measured by the receiving UE, that is larger than a pre-configured first threshold value. The receiving UE may perform a PSBCH decoding process only for a plurality of second S-SSBs having an RSRP that is higher than a pre-configured second threshold value for a PSBCH DM-RS RSRP corresponding to an S-SSB having the highest synchronization priority, among the plurality of first S-SSBs. For example, when an RSRP of a PSBCH DM-RS that is measured by the receiving UE is smaller than a pre-configured first threshold value, and/or when a synchronization priority indicated by the received SL-SSID is lower than a synchronization source that is considered as the current reference sync by the receiving UE, and/or when the measured PSBCH DM-RS is lower than a second threshold value that is pre-configured for a PSBCH DM-RS RSRP corresponding to an S-SSB having the highest synchronization priority, in order to reduce power consumption that is needed for unnecessary PSBCH decoding, the receiving UE may not further carry out the process steps subsequent to the above-described step S1530.

In the present disclosure, a UE may perform PSBCH decoding that is optimized by reducing power consumption that is needed for PSBCH decoding based on information transmitted by an S-PSS, information transmitted by an S-SSS, a PSBCH DM-RS RSRP measurement value, and synchronization priority information indicated by an SL-SSID.

Figure 16:
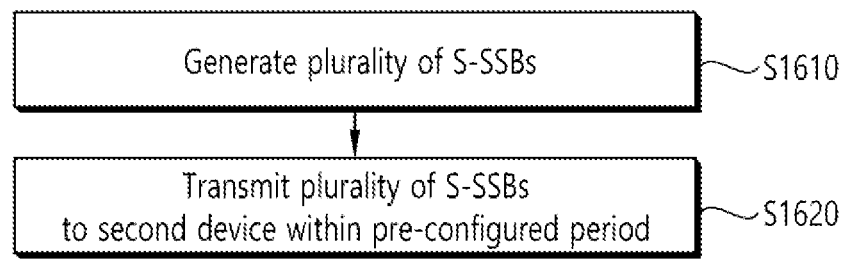
FIG. 16 shows a method for transmitting a plurality of S-SSBs, by a first device, to a second device according to an embodiment of the present disclosure.

FIG. 16 shows a method for transmitting a plurality of S-SSBs, by a first device, to a second device according to an embodiment of the present disclosure. FIG. 16 may be combined with various embodiments of the present disclosure.

Referring to FIG. 16, in step S1610, a first device 100 may generate a plurality of S-SSBs. For example, each of the plurality of S-SSBs may include an S-PSS, S-SSS, and PSBCH.

In step S1620, the first device 100 may transmit a plurality of S-SSBs to a second device 200 within a pre-configured period. For example, the first device 100 may perform scrambling on bit information related to a PSBCH. For example, the first device 100 may demodulate the scrambled bit information to a complex signal. For example, the first device 100 may map the complex signal on a physical layer. For example, scrambling may be performed on a PSBCH that is included in each of the plurality of S-SSBs based on a same scrambling sequence. For example, scrambling may be performed before channel coding. For example, scrambling may be performed after channel coding. For example, a scrambling sequence may be initialized at each pre-configured period based on an SL-SSID. For example, the scrambling sequence may be generated based on an offset value related to a first S-SSB among the plurality of S-SSBs within the pre-configured period. For example, the offset value related to the first S-SSB among the plurality of S-SSBs may be configured for the first device through higher layer signaling. For example, the offset value related to the first S-SSB among the plurality of S-SSBs may be a frame number through which the first S-SSB is transmitted. For example, the offset value related to the first S-SSB among the plurality of S-SSBs may be a slot index through which the first S-SSB is transmitted. For example, the scrambling sequence may be generated based on a time interval in-between the plurality of S-SSBs within the pre-configured period. For example, a time interval in-between the plurality of S-SSBs may be a number of frames. For example, a time interval in-between the plurality of S-SSBs may be a number of slots. For example, the scrambling sequence may be generated based on a value that is pre-configured by higher layer signaling.

For example, the PSBCH may include an index and synchronization resource indicator of an S-SSB including the PSBCH. For example, a synchronization resource for an S-SSB including the PSBCH may be identified based on the synchronization resource indicator.

Alternatively, for example, a scrambling sequence may be differently generated based on a shift value. For example, among a plurality of S-SSBs, in a first S-SSB, a sequence having a length related to a payload of the PSBCH, which is included in the first S-SSB, in a sequence having a pre-configured length, may be generated as the scrambling sequence. For example, among a plurality of S-SSBs, in a second S-SSB, a sequence having a length related to a payload of the PSBCH, which is included in the second S-SSB, from a position that is shifted as much as the shift value, may be generated as the scrambling sequence. For example, the shift value may be determined based on an S-SSB index, a slot index or a frame number. For example, the shift value may be determined based on a field value that is included in an MIB. For example, the field that is included in the MIB may include at least one of a DFN field or a TDD configuration field. For example, the shift value may be determined based on a field that is related to the synchronization resource indicator. For example, the scrambling sequence may be differently generated based on a synchronization resource.

The above-described embodiment may be applied to various devices (or apparatuses) that will hereinafter be described in detail. For example, a processor 102 of the first device 100 may generate a plurality of S-SSBs. And, the processor 102 of the first device 100 may control a transceiver 106 so that the plurality of S-SSBs can be transmitted to the second device 200 within a pre-configured period.

According to an embodiment of the present disclosure, provided herein is a first device configured to perform wireless communication may. For example, the first device may include one or more memories storing instructions, one or more transceivers, and one or more processors connected to the one or more memories and the one or more transceivers. For example, the one or more processors may execute the instructions to generate a plurality of sidelink-synchronization signal blocks (S-SSBs), and to transmit the plurality of S-SSBs to a second device within a pre-configured period, wherein each of the plurality of S-SSBs may include a sidelink primary synchronization signal (S-PSS), a sidelink secondary synchronization signal (S-SSS), and a physical sidelink broadcast channel (PSBCH). For example, in order to transmit the plurality of S-SSBs within the pre-configured period, the first device may perform scrambling on bit information related to the PSBCH, modulate the scrambled bit information to a complex signal, and map the complex signal within a physical resource. For example, the scrambling may be performed for a PSBCH being included in each of the plurality of S-SSBs based on a same scrambling sequence.

According to an embodiment of the present disclosure, provided herein is an apparatus configured to control a first user equipment (UE) performing wireless communication. For example, the apparatus may include one or more processors, and one or more memories operably connected to the one or more processors and storing instructions. For example, the one or more processors may execute the instructions to generate a plurality of sidelink-synchronization signal blocks (S-SSBs), and to transmit the plurality of S-SSBs to a second UE within a pre-configured period, wherein each of the plurality of S-SSBs may include a sidelink primary synchronization signal (S-PSS), a sidelink secondary synchronization signal (S-SSS), and a physical sidelink broadcast channel (PSBCH). For example, in order to transmit the plurality of S-SSBs within the pre-configured period, the first UE may perform scrambling on bit information related to the PSBCH, modulate the scrambled bit information to a complex signal, and map the complex signal within a physical resource. For example, the scrambling may be performed for a PSBCH being included in each of the plurality of S-SSBs based on a same scrambling sequence.

According to an embodiment of the present disclosure, provided herein is a non-transitory computer-readable storage medium storing instructions. For example, when executed, the instructions may cause a first device to generate a plurality of sidelink-synchronization signal blocks (S-SSBs), and to transmit the plurality of S-SSBs to a second device within a pre-configured period, wherein each of the plurality of S-SSBs may include a sidelink primary synchronization signal (S-PSS), a sidelink secondary synchronization signal (S-SSS), and a physical sidelink broadcast channel (PSBCH). For example, in order to transmit the plurality of S-SSBs within the pre-configured period, scrambling may be performed on bit information related to the PSBCH, the scrambled bit information may be modulated to a complex signal, and the complex signal may be mapped within a physical resource. For example, the scrambling may be performed for a PSBCH being included in each of the plurality of S-SSBs based on a same scrambling sequence.

Figure 17:
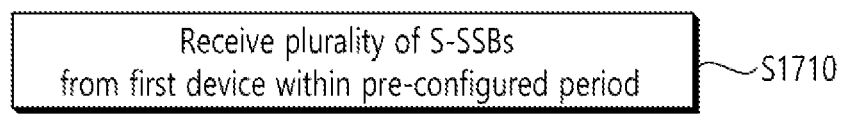
FIG. 17 shows a method for receiving a plurality of S-SSBs, by a second device, from a first device according to an embodiment of the present disclosure.

FIG. 17 shows a method for receiving a plurality of S-SSBs, by a second device, from a first device according to an embodiment of the present disclosure. FIG. 17 may be combined with various embodiments of the present disclosure.

Referring to FIG. 17, in step S1710, a second device 200 may receive a plurality of sidelink-synchronization signal blocks (S-SSBs) from a first device 100 within a pre-configured period. For example, each of the plurality of S-SSBs may include an S-PSS, an S-SSS, and a PSBCH. For example, scrambling may be performed on bit information related to the PSBCH. For example, the scrambled bit information may be modulated to a complex signal. For example, the complex signal may be mapped within a physical resource. For example, the scrambling may be performed for a PSBCH being included in each of the plurality of S-SSBs based on a same scrambling sequence. For example, scrambling may be performed before channel coding. For example, scrambling may be performed after channel coding. For example, a scrambling sequence may be initialized at each pre-configured period based on an SL-SSID. For example, the scrambling sequence may be generated based on an offset value related to a first S-SSB among the plurality of S-SSBs within the pre-configured period. For example, the offset value related to the first S-SSB among the plurality of S-SSBs may be configured for the first device through higher layer signaling. For example, the offset value related to the first S-SSB among the plurality of S-SSBs may be a frame number through which the first S-SSB is transmitted. For example, the offset value related to the first S-SSB among the plurality of S-SSBs may be a slot index through which the first S-SSB is transmitted. For example, the scrambling sequence may be generated based on a time interval in-between the plurality of S-SSBs within the pre-configured period. For example, a time interval in-between the plurality of S-SSBs may be a number of frames. For example, a time interval in-between the plurality of S-SSBs may be a number of slots. For example, the scrambling sequence may be generated based on a value that is pre-configured by higher layer signaling.

For example, the PSBCH may include an index and synchronization resource indicator of an S-SSB including the PSBCH. For example, a synchronization resource for an S-SSB including the PSBCH may be identified based on the synchronization resource indicator.

Alternatively, for example, a scrambling sequence may be differently generated based on a shift value. For example, among a plurality of S-SSBs, in a first S-SSB, a sequence having a length related to a payload of the PSBCH, which is included in the first S-SSB, in a sequence having a pre-configured length, may be generated as the scrambling sequence. For example, among a plurality of S-SSBs, in a second S-SSB, a sequence having a length related to a payload of the PSBCH, which is included in the second S-SSB, from a position that is shifted as much as the shift value, may be generated as the scrambling sequence. For example, the shift value may be determined based on an S-SSB index, a slot index or a frame number. For example, the shift value may be determined based on a field value that is included in an MIB. For example, the field that is included in the MIB may include at least one of a DFN field or a TDD configuration field. For example, the shift value may be determined based on a field that is related to the synchronization resource indicator. For example, the scrambling sequence may be differently generated based on a synchronization resource.

The above-described embodiment may be applied to various devices (or apparatuses) that will hereinafter be described in detail. For example, a processor 202 of the second device 200 may control a transceiver 206 so that a plurality of S-SSBs can be received from a first device 100 within a pre-configured period.

According to an embodiment of the present disclosure, provided herein is a second device configured to perform wireless communication. For example, the second device may include one or more memories storing instructions, one or more transceivers, and one or more processors connected to the one or more memories and the one or more transceivers. For example, the one or more processors may execute the instructions to receive a plurality of sidelink-synchronization signal blocks (S-SSBs) from a first device within a pre-configured period. For example, each of the plurality of S-SSBs may include a sidelink primary synchronization signal (S-PSS), a sidelink secondary synchronization signal (S-SSS), and a physical sidelink broadcast channel (PSBCH). For example, scrambling may be performed on bit information related to the PSBCH. For example, the scrambled bit information may be modulated to a complex signal. For example, the complex signal may be mapped within a physical resource. For example, the scrambling may be performed for a PSBCH being included in each of the plurality of S-SSBs based on a same scrambling sequence.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
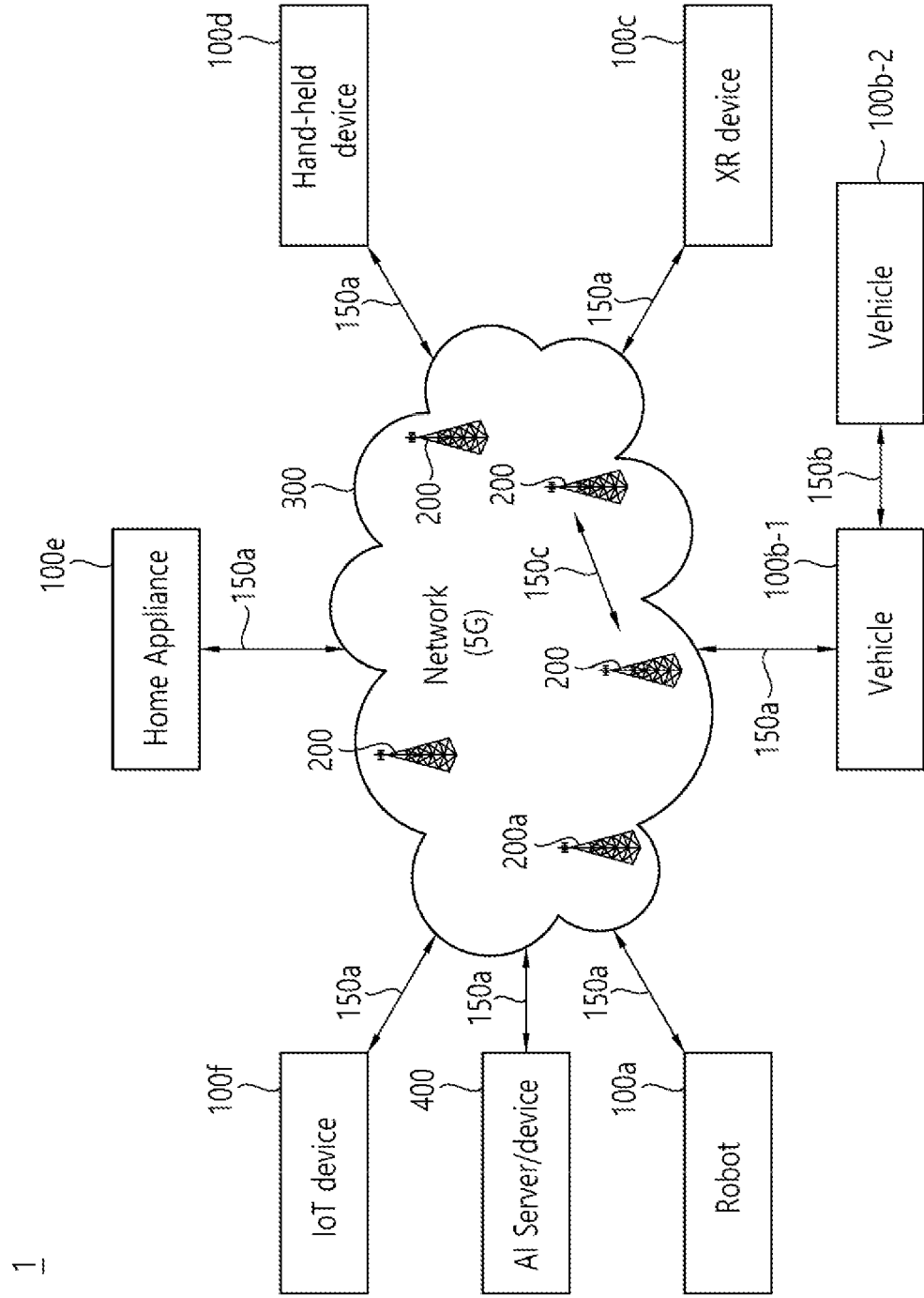
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
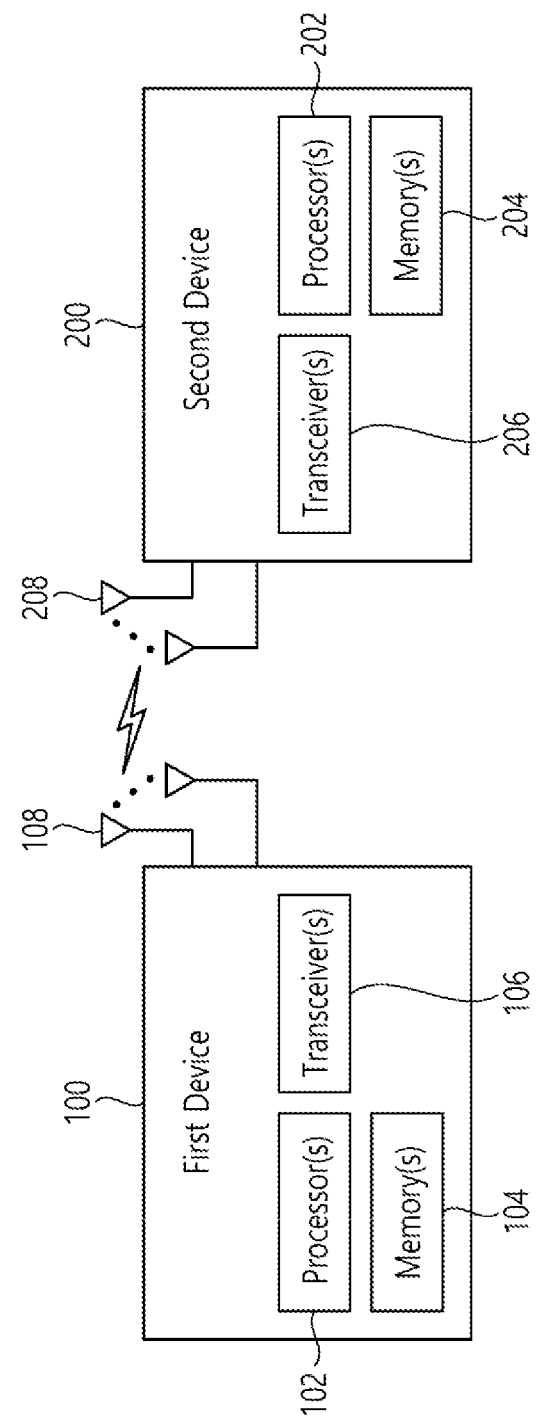
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
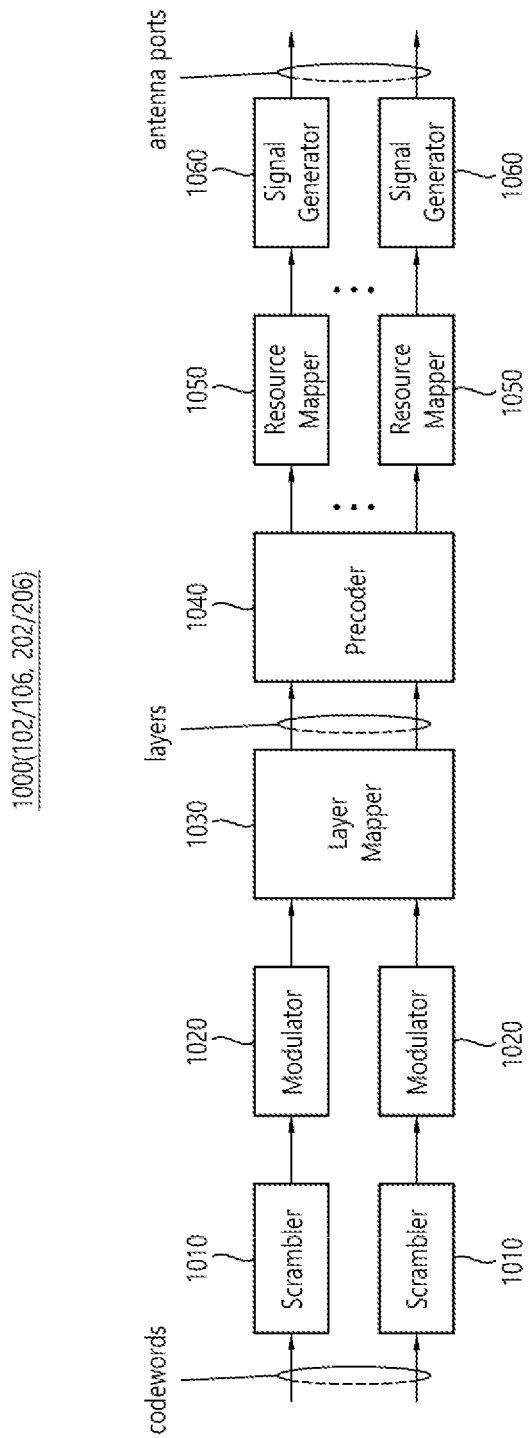
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
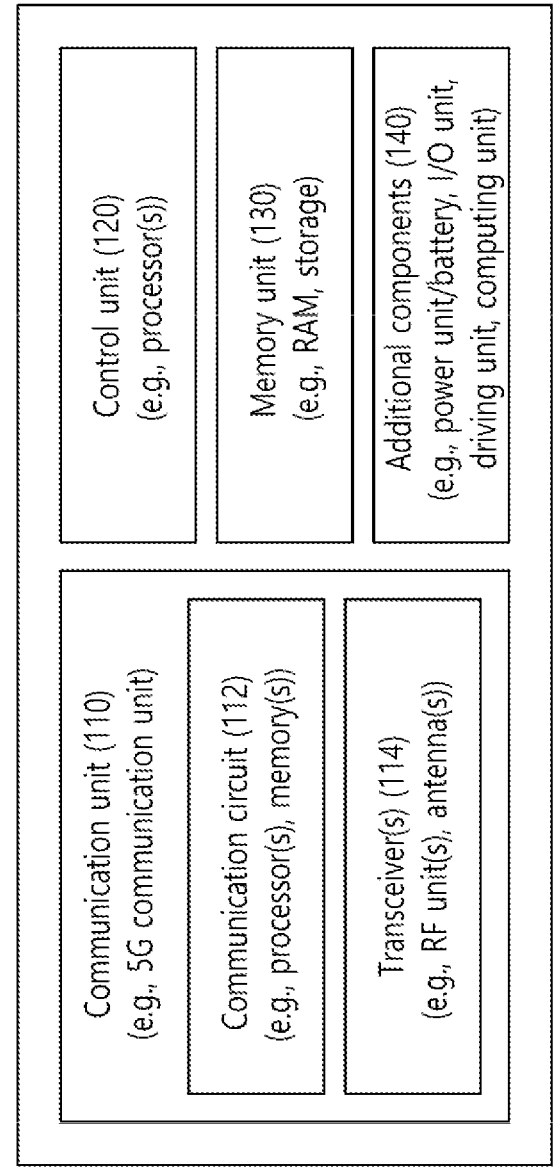
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
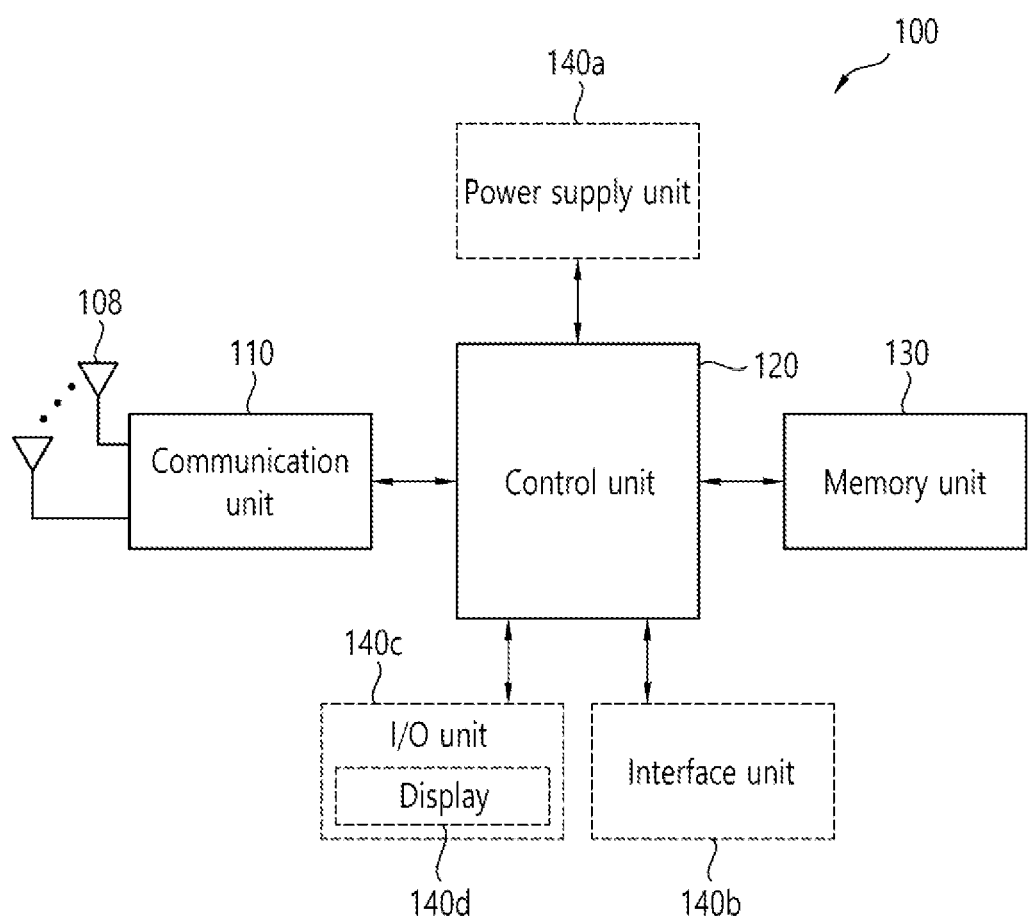
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
    generating a plurality of sidelink-synchronization signal blocks (S-SSBs); and
    transmitting, to a second device, the plurality of S-SSBs in each period with a pre-configured periodicity,
    wherein each of the plurality of S-SSBs includes a sidelink primary synchronization signal (S-PSS), a sidelink secondary synchronization signal (S-SSS), and a physical sidelink broadcast channel (PSBCH),
    wherein transmitting the plurality of S-SSBs in the each period comprises:
        performing scrambling on bit information related to the PSBCH;
        modulating the scrambled bit information to a complex signal; and
        mapping the complex signal within a physical resource,
    wherein the scrambling on the bit information related to the PSBCH is performed based on a scrambling sequence, and
    wherein a same scrambling sequence is applied to each of a plurality of PSBCHs in the each period with the pre-configured periodicity.

2. The method of claim 1, wherein the scrambling sequence is initialized at the each period based on a sidelink synchronization identity (SL-SSID).

3. The method of claim 1, wherein the scrambling sequence is generated based on an offset value related to a first S-SSB among the plurality of S-SSBs in the each period with the pre-configured periodicity.

4. The method of claim 3, wherein the offset value related to the first S-SSB among the plurality of S-SSBs is configured for the first device through higher layer signaling.

5. The method of claim 3, wherein the offset value related to the first S-SSB among the plurality of S-SSBs is a frame number through which the first S-SSB is transmitted.

6. The method of claim 3, wherein the offset value related to the first S-SSB among the plurality of S-SSBs is a slot index through which the first S-SSB is transmitted.

7. The method of claim 1, wherein the scrambling sequence is generated based on a time interval in-between the plurality of S-SSBs in the each period with the pre-configured periodicity.

8. The method of claim 7, wherein a time interval in-between the plurality of S-SSBs is a number of frames.

9. The method of claim 7, wherein a time interval in-between the plurality of S-SSBs is a number of slots.

10. The method of claim 1, wherein the scrambling sequence is generated based on a value that is pre-configured by higher layer signaling.

11. The method of claim 1, wherein the PSBCH includes an index and synchronization resource indicator of an S-SSB including the PSBCH.

12. The method of claim 11, wherein a synchronization resource for an S-SSB including the PSBCH is identified based on the synchronization resource indicator.

13. The method of claim 1, wherein the scrambling is performed after channel coding.

14. A first device configured to perform wireless communication, the first device comprising:
    one or more memories storing instructions;
    one or more transceivers; and
    one or more processors connected to the one or more memories and the one or more transceivers, wherein the one or more processors execute the instructions to:
        generate a plurality of sidelink-synchronization signal blocks (S-SSBs), and
        transmit, to a second device, the plurality of S-SSBs in the each period with the pre-configured periodicity,
    wherein each of the plurality of S-SSBs includes a sidelink primary synchronization signal (S-PSS), a sidelink secondary synchronization signal (S-SSS), and a physical sidelink broadcast channel (PSBCH),
    wherein, in order to transmit the plurality of S-SSBs in the each period:
        scrambling is performed on bit information related to the PSBCH,
        the scrambled bit information is modulated to a complex signal, and
        the complex signal is mapped within a physical resource,
    wherein the scrambling on the bit information related to the PSBCH is performed based on a scrambling sequence, and
    wherein a same scrambling sequence is applied to each of the plurality of PSBCHs in the each period with the pre-configured periodicity.

15. The first device of claim 14, wherein the scrambling sequence is initialized at each pre-configured period based on an SL-SSID.

16. The first device of claim 14, wherein the scrambling sequence is generated based on an offset value related to a first S-SSB among the plurality of S-SSBs in the each period with the pre-configured periodicity.

17. The first device of claim 16, wherein the offset value related to the first S-SSB among the plurality of S-SSBs is configured for the first device through higher layer signaling.

18. The first device of claim 16, wherein the offset value related to the first S-SSB among the plurality of S-SSBs is a frame number through which the first S-SSB is transmitted.

19. The first device of claim 16, wherein the offset value related to the first S-SSB among the plurality of S-SSBs is a slot index through which the first S-SSB is transmitted.

20. An apparatus configured to control a first user equipment (UE) performing wireless communication, the apparatus comprising:
    one or more processors; and
    one or more memories operably connected to the one or more processors and storing instructions, wherein the one or more processors execute the instructions to:
        generate a plurality of sidelink-synchronization signal blocks (S-SSBs), and
        transmit, to a second UE, the plurality of S-SSBs in the each period with the pre-configured periodicity,
    wherein each of the plurality of S-SSBs includes a sidelink primary synchronization signal (S-PSS), a sidelink secondary synchronization signal (S-SSS), and a physical sidelink broadcast channel (PSBCH),
    wherein, in order to transmit the plurality of S-SSBs in the each period:
        scrambling is performed on bit information related to the PSBCH,
        the scrambled bit information is modulated to a complex signal, and
        the complex signal is mapped within a physical resource,
    wherein the scrambling on the bit information related to the PSBCH is performed based on a scrambling sequence, and wherein a same scrambling sequence is applied to each of the plurality of PSBCHs in the each period with the pre-configured periodicity.

\* \* \* \* \*